United States Patent
Vaikar

(10) Patent No.: US 12,032,970 B2
(45) Date of Patent: Jul. 9, 2024

(54) REDUCING THE STARTUP LATENCY OF FUNCTIONS IN A FaaS INFRASTRUCTURE

(71) Applicant: VMware LLC, Palo Alto, CA (US)

(72) Inventor: Amol Manohar Vaikar, Pune (IN)

(73) Assignee: VMware LLC, Palo Alto, CA (US)

(*) Notice: Subject to any disclaimer, the term of this patent is extended or adjusted under 35 U.S.C. 154(b) by 708 days.

(21) Appl. No.: 17/127,747

(22) Filed: Dec. 18, 2020

(65) Prior Publication Data
US 2021/0109783 A1 Apr. 15, 2021
US 2023/0176900 A9 Jun. 8, 2023

Related U.S. Application Data

(63) Continuation of application No. 16/269,579, filed on Feb. 7, 2019, now Pat. No. 10,901,783.

(30) Foreign Application Priority Data

Oct. 16, 2018 (IN) .............................. 201841039208

(51) Int. Cl.
| G06F 9/455 | (2018.01) |
| G06F 9/445 | (2018.01) |
| G06F 9/48  | (2006.01) |
| G06F 9/54  | (2006.01) |

(52) U.S. Cl.
CPC ............ G06F 9/445 (2013.01); G06F 9/4881 (2013.01); G06F 9/547 (2013.01); G06F 9/548 (2013.01)

(58) Field of Classification Search
CPC ........ G06F 9/4881; G06F 9/445; G06F 9/547; G06F 9/548
See application file for complete search history.

(56) References Cited

U.S. PATENT DOCUMENTS

| 8,843,894 B2 | 9/2014 | Dawson et al. |
| 2019/0028552 A1* | 1/2019 | Johnson, II ............ H04L 67/146 |
| 2019/0179678 A1 | 6/2019 | Banerjee et al. |

(Continued)

OTHER PUBLICATIONS

C. Abad, E. Boza and E. Eyk, "Package-Aware Scheduling of Faas Functions", Proc. of the 2018 ACM/SPEC Int. Conf. on Performance Engineering, pp. 101-106, Apr. 2018 (Year: 2018).

(Continued)

*Primary Examiner* — Jacob D Dascomb
(74) *Attorney, Agent, or Firm* — Quarles & Brady LLP

(57) ABSTRACT

Techniques for reducing the startup latency of functions in a Functions-as-a-Service (FaaS) infrastructure are provided. In one set of embodiments, a function manager of the FaaS infrastructure can receive a request to invoke a function uploaded to the infrastructure and can retrieve information associated with the function. The retrieved information can include an indicator of whether instances of the function may be sticky (i.e., kept in host system primary memory after function execution is complete), and a list of zero or more host systems in the FaaS infrastructure that currently have an unused sticky instance of the function in their respective primary memories. If the indicator indicates that instances of the function may be sticky and if the list identifies at least one host system with an unused sticky instance of the function in its primary memory, the function manager can select the at least one host system for executing the function.

18 Claims, 8 Drawing Sheets

(56) References Cited

U.S. PATENT DOCUMENTS

2020/0081745 A1    3/2020  Cybulski et al.
2020/0117470 A1    4/2020  Vaikar
2020/0364098 A1*  11/2020  Yan ........................ G06F 9/5038

OTHER PUBLICATIONS

Related Indian Application No. 201841039208, filed Oct. 16, 2018, entitled "Reducing the Startup Latency of Functions in a Faas Infrastructure".

* cited by examiner

REDUCING THE STARTUP LATENCY OF FUNCTIONS IN A FaaS INFRASTRUCTURE

CROSS-REFERENCES TO RELATED APPLICATIONS

The present application is a continuation of U.S. application Ser. No. 16/269,579 filed Feb. 7, 2019 and entitled "Reducing the Startup Latency of Functions in a FaaS Infrastructure," which in turn claims priority to Indian Application No. 201841039208 filed Oct. 16, 2018 and entitled "Reducing the Startup Latency of Functions in a FaaS Infrastructure." These applications are incorporated herein by reference in their entireties for all purposes.

BACKGROUND

Functions-as-a-service (FaaS) is a computing model in which application developers create and upload modular chunks of application functionality (referred to as "functions") to a cloud-based FaaS infrastructure. The FaaS infrastructure is responsible for executing each function as needed on an appropriate host system of the infrastructure in an independent and scalable manner.

For example, consider an ETL (extract, transform, and load) application that (1) that reads data from a first database, (2) transforms the data according to one or more rules, and (3) writes the transformed data to a second database. In this case, the developer of the ETL application can create and upload each of (1), (2), and (3) as a separate function to the FaaS infrastructure. Each of these functions is stored as an "image" (e.g., an executable file, a virtual machine (VM), a container, or the like) on the infrastructure. At a time the ETL application is run, the FaaS infrastructure can receive an invocation of a particular function and can select a host system in the infrastructure for carrying out the function invocation. The selected host system can then load the function image into its primary (e.g., volatile) memory, which creates a copy (i.e., instance) of the function in the primary memory, and can execute the function instance.

Generally speaking, in existing FaaS implementations, function instances are ephemeral. In other words, function instances are not retained in primary memory by the FaaS infrastructure after their execution is complete; instead, they are immediately purged/released from primary memory upon function completion. While this approach ensures that there is sufficient free space in the primary memory pool for loading and executing other functions, it undesirably increases the startup time needed for executing successive invocations of a given function (since it requires reloading the function image into memory for each invocation). This repeated loading can degrade the performance of applications that invoke certain functions on a frequent basis.

In addition, in some cases, functions can depend on other functions according to a chain of function invocations. For instance, in the ETL application example above, the function for (1) may always be followed by an invocation of the function for (2), which in turn may always be followed by an invocation of the function for (3). In this and other similar scenarios, the need to reload a function image into primary memory each time the function is invoked can undesirably increase the execution time of such function chains.

SUMMARY

Techniques for reducing the startup latency of functions in a Functions-as-a-Service (FaaS) infrastructure are provided. In one set of embodiments, a function manager of the FaaS infrastructure can receive a request to invoke a function uploaded to the infrastructure and can retrieve information associated with the function. The retrieved information can include an indicator of whether instances of the function may be sticky (i.e., kept in host system primary memory after function execution is complete), and a list of zero or more host systems in the FaaS infrastructure that currently have an unused sticky instance of the function in their respective primary memories. If the indicator indicates that instances of the function may be sticky and if the list identifies at least one host system with an unused sticky instance of the function in its primary memory, the function manager can select the at least one host system for executing the function.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for reducing the startup latency of functions in a FaaS infrastructure. According to a first set of embodiments (collectively referred to as the "sticky function" approach), a host system in the FaaS infrastructure that is tasked with executing a function can keep an instance of the function in its primary memory upon function completion, rather than immediately releasing the function instance. In some embodiments, the host system can keep up to X instances of the function in primary memory, where X is a configurable number. With this approach, the host system does not need to reload the function image into primary memory the next time the function is invoked and the host is selected to execute it, thereby reducing the startup latency of the function.

According to a second set of embodiments (collectively referred to as the "read ahead chaining" approach), a function manager component of the FaaS infrastructure can identify function chains that are commonly invoked during the runtime of an application. For example, for a particular application A, the function manager may determine that application A commonly results in the invocation of a first function chain F1→F2→F3 and a second function chain F4→F5. The function manager may identify these function chains by referring to a configuration file provided by the application developer, and/or by observing the runtime function call patterns of the application and implicitly deriving the function chains from those patterns. Then, when the function manager detects that a function in a function chain has been invoked, the function manager can cause the image for the next function in the function chain to be pre-loaded into the primary memory of a host system of the FaaS infrastructure. In this way, that next function will be ready for immediate execution (without any startup delay) once the current function in the chain has finished executing.

The foregoing and other aspects of the present disclosure are described in further detail below.

2. Example FaaS Infrastructure

Figure 1A:
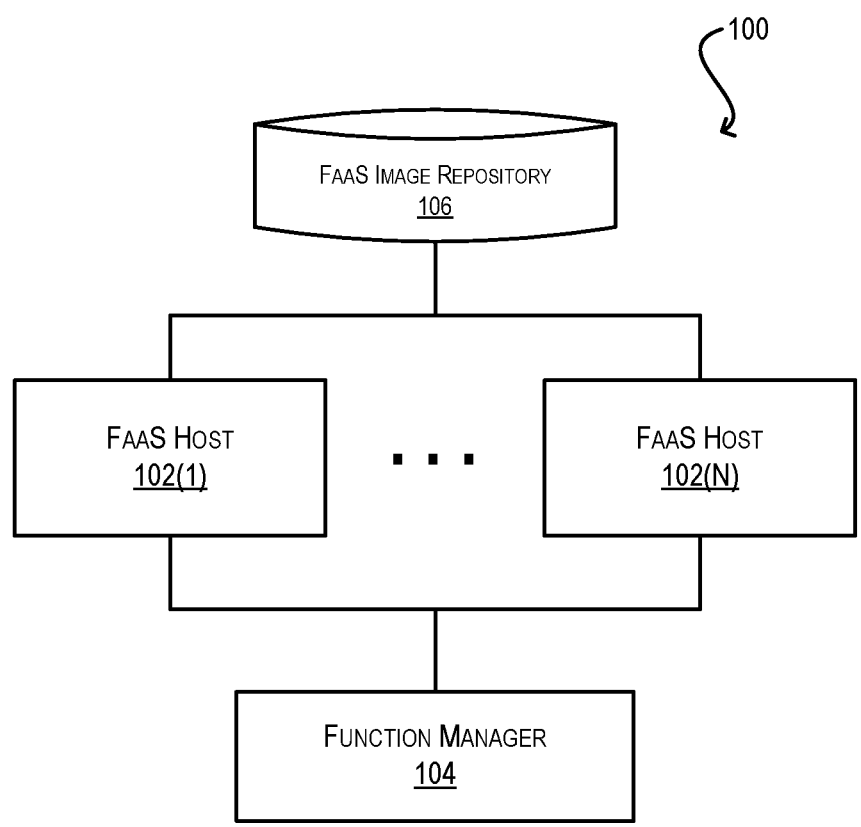
FIG. 1A depicts an example FaaS infrastructure.

FIG. 1A is a simplified block diagram of an example FaaS infrastructure 100 in which embodiments of the present disclosure may be implemented. As shown, FaaS infrastructure 100 includes a plurality of FaaS hosts 102(1)-(N) communicatively coupled with a function manager 104 and a FaaS image repository 106. In practice, application developers that wish to leverage FaaS infrastructure 100 can create and upload functions to infrastructure 100 that correspond to modular portions of functionality in their applications. For example, one such function may encapsulate program code for extracting data from a file, another such function may encapsulate program code for processing the extracted data in a certain way, and so on. These functions are maintained by FaaS infrastructure 100 in the form of function images (which may be, e.g., executable files, VMs, containers, etc.) in FaaS image repository 106.

When an application that makes use of an uploaded function is run, function manager 104 can receive an invocation request for that function and can select one of FaaS hosts 102(1)-(N) for carrying out the function. Function manager 104 can make this selection based on various criteria such as system load, available network bandwidth, and the like. The selected FaaS host can then retrieve the image for the invoked function from FaaS image repository 106, load/initialize the function image in its primary memory (thereby creating an instance of the function in the primary memory), and execute the function instance.

Figure 1B:
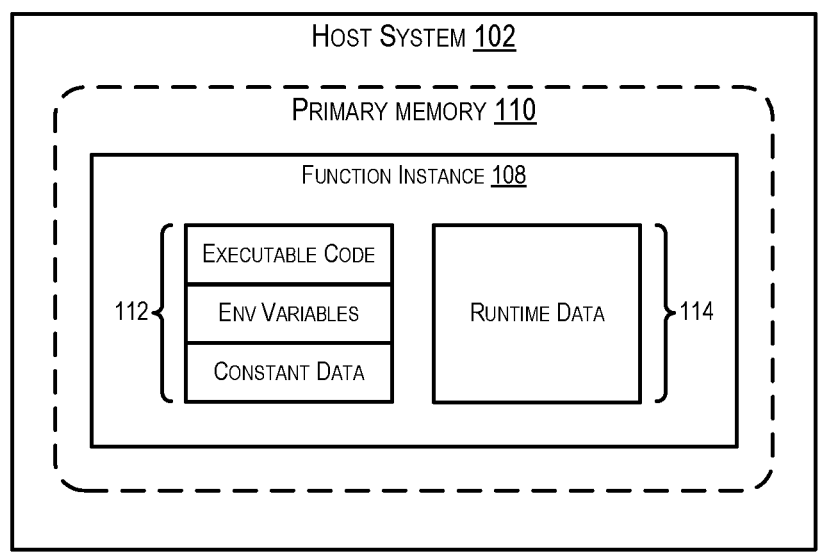
FIG. 1B depicts an example host system in the FaaS infrastructure of FIG. 1B.

FIG. 1B is a more detailed diagram of a FaaS host 102 in FaaS infrastructure 100 that illustrates the structure of a function instance 108 which has been created in the host's primary memory 110 once the function's image has been loaded. As shown, function instance 108 generally comprises two parts: (1) a static (i.e., read-only) portion 112 including, e.g., the function's executable code, environment variables, constant data, and so on, and (2) a dynamic (i.e., readable/writable) portion 114 including runtime data. When function instance 108 is first created in primary memory 110 by FaaS host 102, static portion 112 is initialized. The runtime data in dynamic portion 114 is subsequently populated once function instance 108 begins executing and generates data in its stack/heap.

As noted in the Background section, one issue with existing FaaS implementations is that FaaS hosts generally purge/release function instances from their primary memory immediately upon function completion. For instance, with respect to the example of FIG. 1B, according to a conventional implementation FaaS host 102 would typically release function instance 108 (along with its constituent portions 112 and 114) from primary memory 110 once the function has finished executing. This ensures that there is sufficient free space in primary memory 110 to load and execute subsequently-invoked functions. However, if the function is invoked again (and FaaS host 102 is selected as the executing host), FaaS host 102 must necessarily re-load the function's image from FaaS image repository 106 before it can begin function execution. The time needed to re-load the function image affects the startup latency of the function, which in turn affects its overall execution time.

Figure 2:
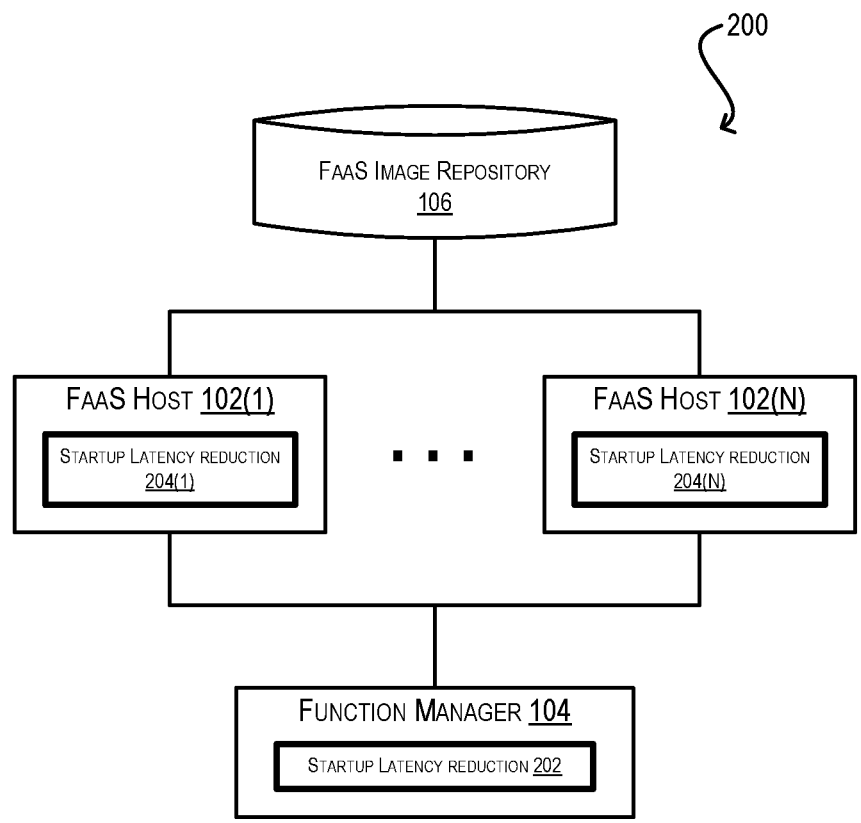
FIG. 2 depicts a FaaS infrastructure that implements the techniques of the present disclosure.

To address this issue, FIG. 2 depicts an enhanced version of the FaaS infrastructure of FIG. 1A (shown as infrastructure 200) that includes startup latency reduction logic components 202 and 204 in function manager 104 and FaaS hosts 102(1)-(N) respectively. Logic components 202 and 204 can be implemented in software, hardware, or a combination thereof. At a high level, function manager 104 and FaaS hosts 102(1)-(N) can leverage logic components 202 and 204 to implement two novel approaches for reducing the startup latency of function executions within FaaS infrastructure 200: (1) a sticky function approach and (2) a read-ahead chaining approach.

With the sticky function approach, each FaaS host 102 can retain a certain number of function instances in primary memory, even after the function instances have finished executing. The retained function instances are referred to as "sticky instances." Thus, this approach can avoid the need for the FaaS host to reload the images for such sticky instances from FaaS image repository 106 upon subsequent invocations, thereby reducing the startup time for the functions.

Further, with the read-ahead chaining approach, function manager 104 can identify, via either explicit or implicit means, chains of functions that are commonly invoked for a given application (or with respect to a given invoker/account/namespace/tenant/etc.) and can store this function chain information. Then, when function manager 104 receives a request to invoke a particular function, the function manager can check whether the function is part of an identified function chain. If so, function manager 104 can determine the next function in the chain and can cause the image for that next function to be pre-loaded on a FaaS host in the infrastructure, thereby ensuring that an instance of the next function is ready for execution immediately upon completion of the current function. In certain embodiments, this read-ahead chaining approach can be used in conjunction with the sticky function approach (for example, function manager 104 can avoid pre-loading the next function if it is already loaded on a FaaS host by virtue of being sticky).

The details of these two approaches are discussed in turn in the sections that follow.

3. Sticky Functions

Figure 3:
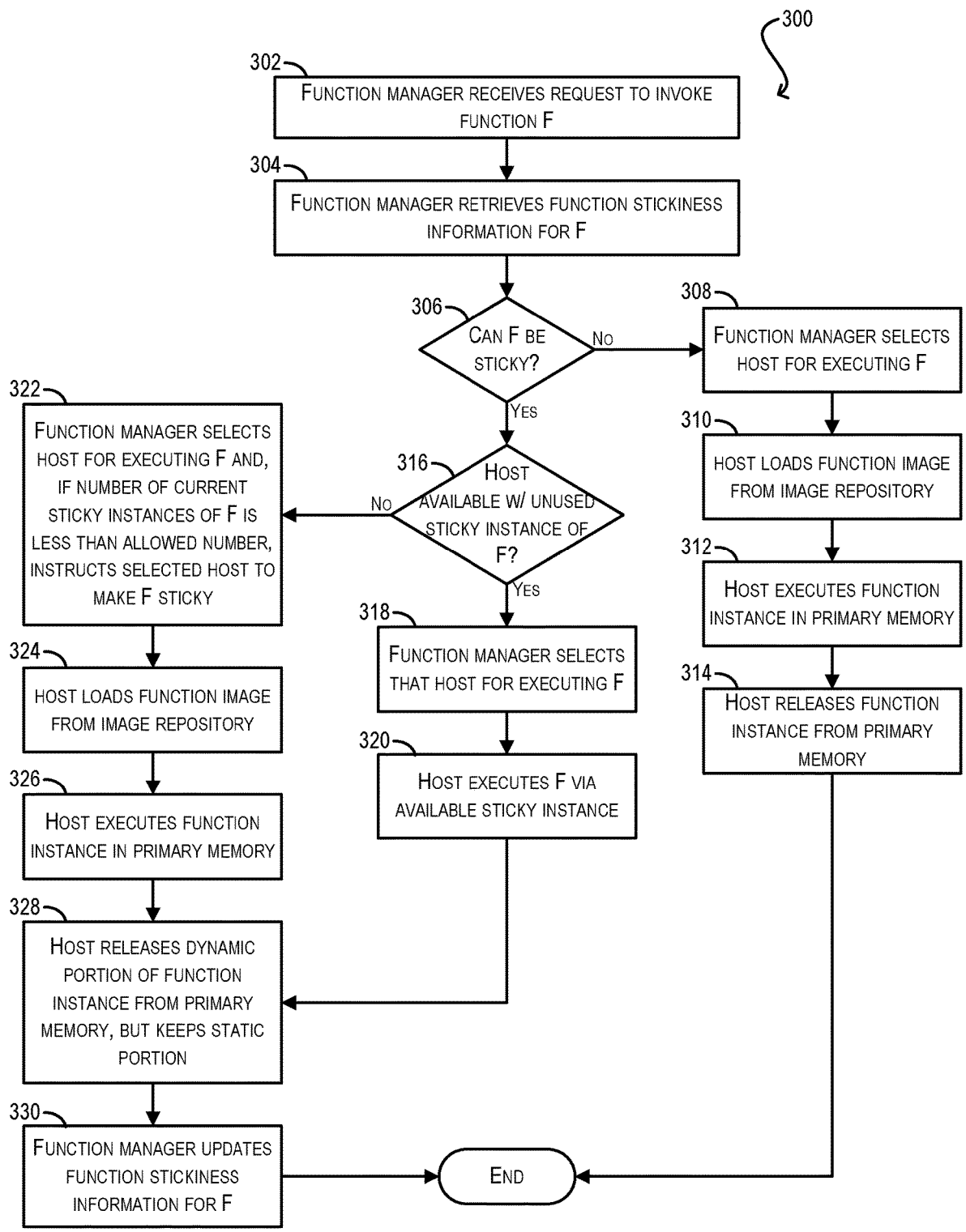
FIG. 3 depicts a workflow for implementing sticky functions according to an embodiment

FIG. 3 depicts a workflow 300 that may be executed by function manager 104 and FaaS hosts 102(1)-(N) of FaaS infrastructure 200 (in accordance with respective logic components 202 and 204) for reducing function startup latency via sticky functions according to an embodiment.

Starting with block 302, function manager 104 can receive a request to invoke a function F uploaded to FaaS infrastructure 200. In response, at block 304 function manager 104 can retrieve, from a local or remote database, function stickiness information for F, where this function stickiness information can include, among other things: (1) a flag or indicator indicating whether F can be sticky, (2) the current number of sticky instances of F (i.e., instances of F that are currently retained in host primary memory after execution), (3) the maximum number of sticky instances of F that are concurrently allowed, and (4) the identities of FaaS hosts in FaaS infrastructure 200 that currently have one or more sticky instances of F in their primary memory. Note that a FaaS host may have multiple sticky instances of a given function. In one set of embodiments, items (1) and (3) can be preconfigured by the developer that uploaded function F to FaaS infrastructure 200. Alternatively, these items can be programmatically determined by function manager 104 based on, e.g., the frequency of invocation of function F over a certain time period and/or other criteria.

Upon retrieving the function stickiness information, function manager 104 can first check whether function F can be sticky (block 306). If not, function manager 104 can select a FaaS host 102 for executing the function (block 308) and the selected FaaS host can load the function image from FaaS image repository 106 into its primary memory (thereby creating an instance of F) (block 310), execute the function instance (block 312), and release the entirety of the function instance from primary memory (block 314). The workflow can then end.

However, if function F can be sticky at block 306, function manager 104 can further check, based on the function stickiness information, whether there is a FaaS host that currently has an available (i.e., unused) sticky instance of F (block 316). If so, function manager 104 can select that particular FaaS host for executing function F (block 318), and the FaaS host can directly execute F via the available sticky instance, without having to first load the image of F from FaaS image repository 106 (since the sticky instance is already loaded in the host's primary memory) (block 320).

On the other hand, if function manager 104 determines at block 316 that there is no FaaS host with an available sticky instance of F, function manager 104 can select a FaaS host 102 for executing the function and, assuming the total number of current sticky instances of F is less than the total number of allowed sticky instances of F, can instruct the selected FaaS host to keep the instance of F in primary memory (i.e., make it sticky) upon function completion (block 322).

In response, the selected FaaS host can load the function image from FaaS image repository 106 into its primary memory (thereby creating a new instance of F) (block 324) and execute the function instance (block 326). Once the function instance has completed execution, the FaaS host can release the dynamic portion of the function instance from primary memory, but keep the static portion (as this portion will remain sticky and be reused for the next invocation of F on the host) (block 328).

Finally, at block 330, function manager 104 can update its function stickiness database to increment the total number of concurrent sticky instances of F and to include the FaaS host selected at block 322 in the list of hosts that currently have a sticky instance of F. Workflow 300 can subsequently end. Although not shown in FIG. 3, once a function instance is made sticky on a given FaaS host, it may be later removed from the host's primary memory if certain conditions are met or if a certain trigger event occurs. For example, in one embodiment, a sticky function instance may be removed from host primary memory if the function instance remains unused for a certain period of time. In another embodiment, the sticky function instance may be removed if the function is "upgraded" (i.e., the function definition/image is changed) or uninstalled on the FaaS infrastructure.

4. Read-Ahead Chaining

Figure 4:
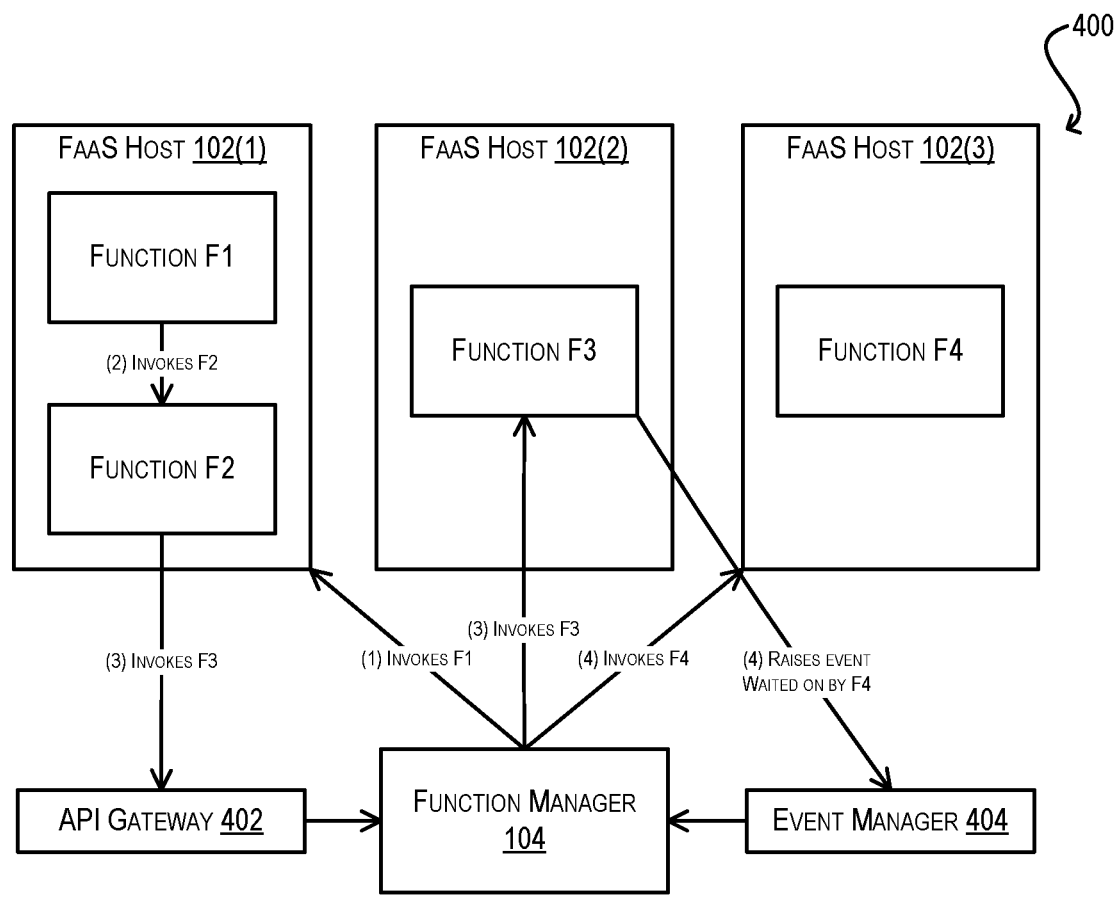
FIG. 4 depicts an example function chain according to an embodiment.

As mentioned previously, in some cases functions in a FaaS infrastructure may depend on (i.e., result in the invocation of) other functions according to chains of function invocations. This may occur if, for instance, one function explicitly calls another function, or if the execution of one function results in the occurrence of some event or other trigger that ultimately causes the invocation of another function. Merely by way of example, FIG. 4 depicts a sample function chain 400 in which (1) function manager 104 invokes a first function F1; (2) first function F1 explicitly invokes a second function F2; (3) second function F2 invokes, through an API gateway 402 and function manager 104, a third function F3; and (4) third function F3 raises an event via an event manager 404 that results in the invocation of a fourth function F4.

Figure 5A:
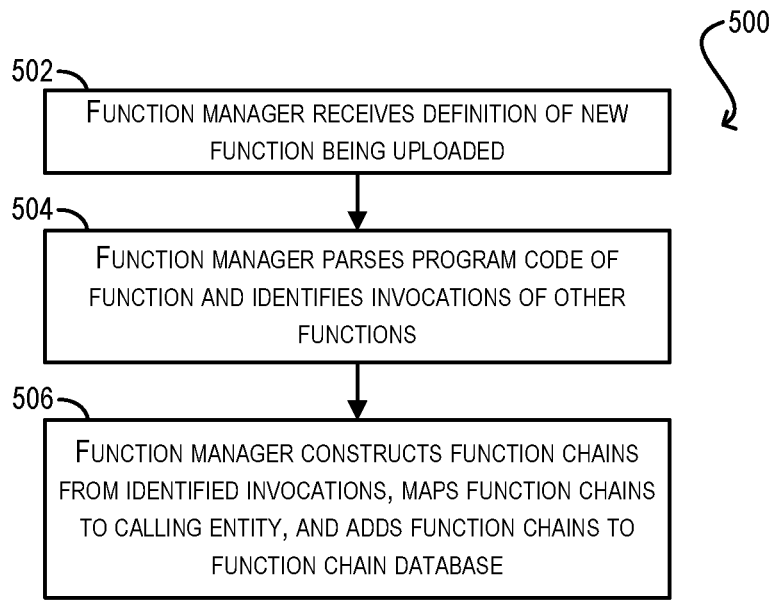
FIGS. 5A and 5B depict workflows for implicitly identifying function chains according to various embodiments.
Figure 5B:
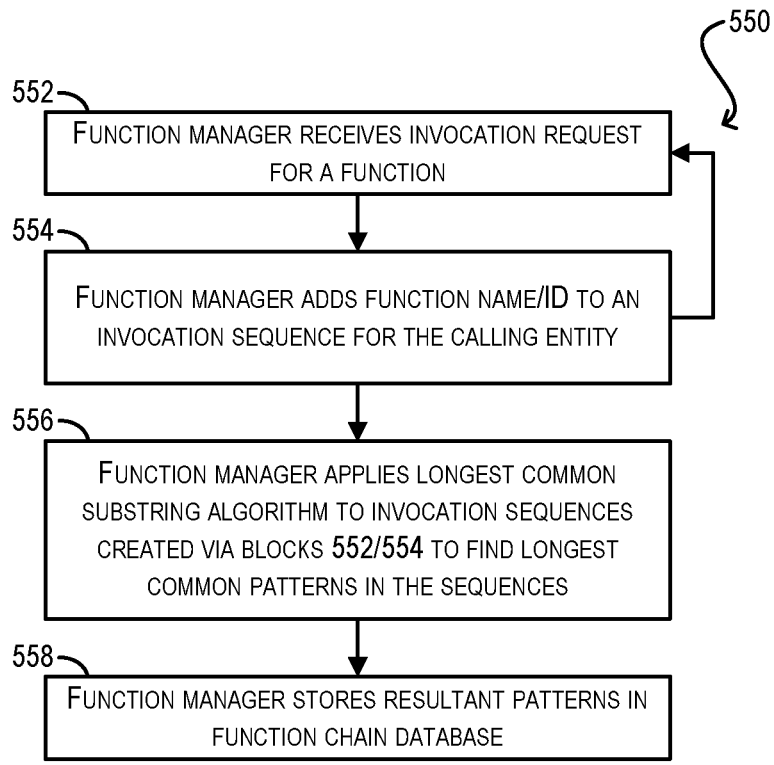
Figure 6:
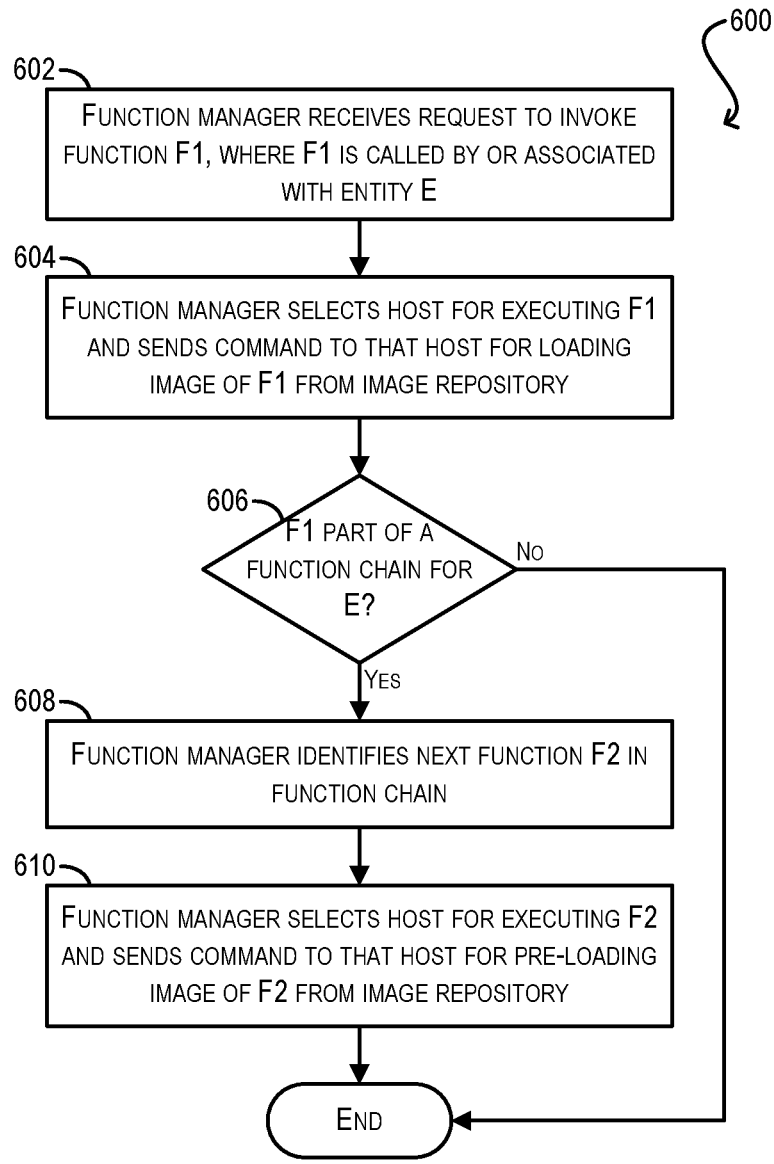
FIGS. 6 and 7 depict workflows for pre-loading functions based on function chains according to various embodiments.
Figure 7:
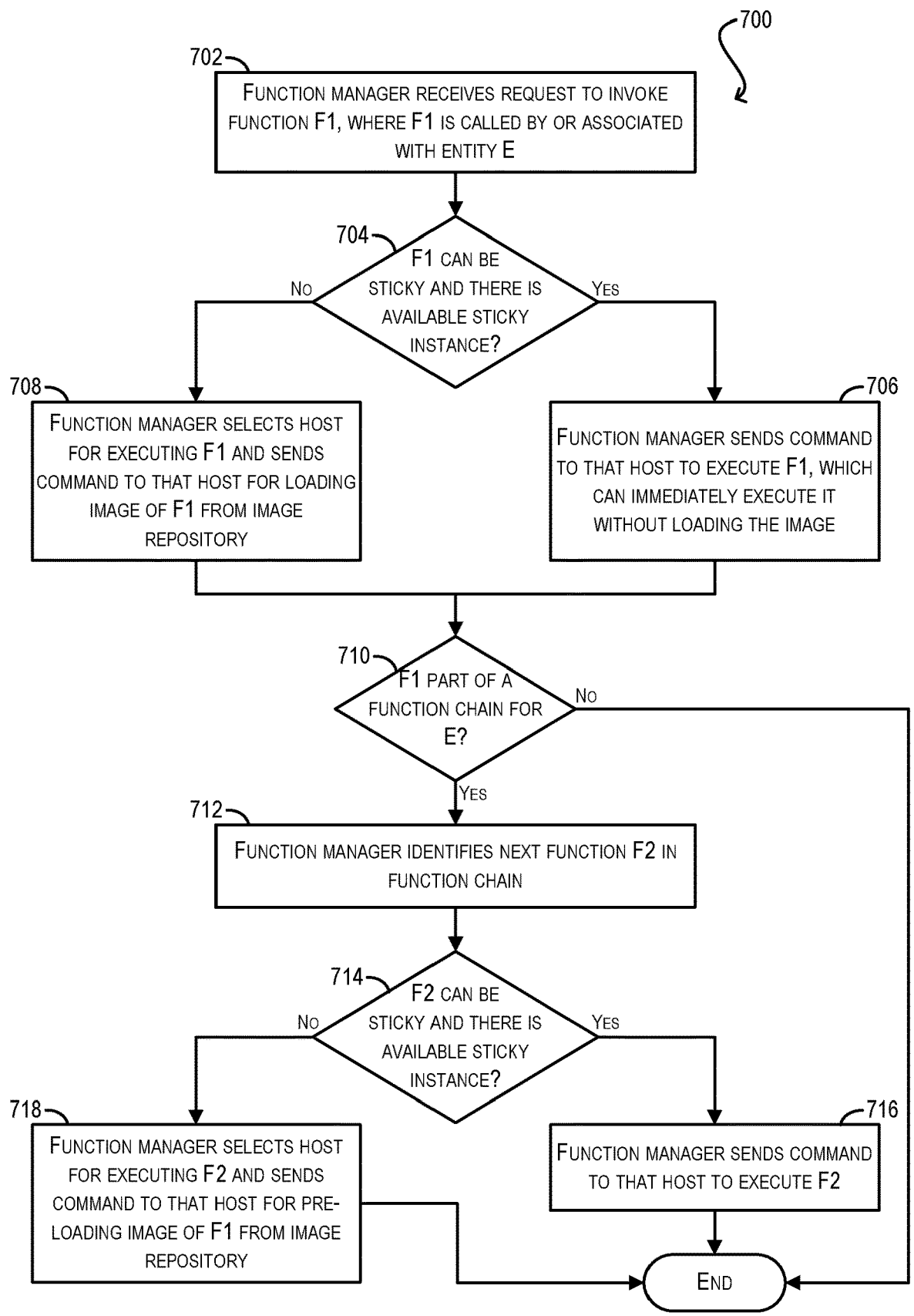

For applications where such function chains are common, the startup latency caused by having to load the image for each function in a chain at the time of function execution can significantly affect the total execution time for the chain. To address this, FIGS. 5A and 5B depict workflows 500 and 550 respectively that can be implemented by function manager 104 for identifying functions chains commonly invoked by a calling entity (e.g., an application, account, tenant, invoker, etc.), and FIGS. 6 and 7 depict workflows 600 and 700 respectively that can be implemented by function manager 104 for pre-loading the image for the next function in a function chain when a current function in the chain is invoked. Taken together, these workflows enable function manager 104 to significantly reduce the total execution time for function chains by ensuring that the next function in each chain is loaded on a FaaS host and ready for execution by the time the previous function in the chain has finished executing.

4.1 Identifying Function Chains

In one set of embodiments, function manager 104 can identify the function chains that are invoked by a particular calling entity by referring to configuration information explicitly provided by, e.g., a developer. For example, the developer may provide a configuration file that lists all of the function chains used by the developer's application.

Alternatively, function manager 104 can implicitly determine this information by examining the function program code and/or by observing the calling behavior of the entity. Workflow 500 of FIG. 5A depicts a process for implicitly identifying function chains based on the former (i.e., function program code) and workflow 550 of FIG. 5B depicts a process for implicitly identifying function chains based on the latter (i.e., observed calling behavior).

Starting with block 502 of workflow 500, function manager 104 can receive the definition for a new function being uploaded/deployed to the FaaS infrastructure. This function definition can include the program code for implementing the function, which may take the form of bytecode or compiled code depending on the programming language used.

At block 504, function manager 104 can parse the bytecode or compiled code of the function and identify explicit invocations in the bytecode/compiled code to other functions uploaded to the FaaS infrastructure.

Finally, at block 506, function manager 106 can construct function chains based on the explicit invocations identified at block 504, map the function chains to an entity associated with the function uploaded at block 502 (e.g., an application, an account, a tenant, etc.) and store the function chains and mapped entity information to a function chain database.

Turning now to block 552 of workflow 550, function manager 104 can receive, during the runtime of an application, an invocation request for a function. In response, function manager 104 can add a name or other identifier of the function (e.g., a function GUID) to an invocation sequence for an entity associated with the function invocation (e.g., application, account, tenant, etc.) (block 554). Function manager 104 can subsequently repeat blocks 552 and 554 over several time periods, thereby creating one invocation sequence per time period (block 556). For example, for time period T1 a sequence may be created comprising F1→F2→F3→F4, for time period T2 a sequence may be created comprising F1→F2→F4→F5, and for time period T3 a sequence may be created comprising F1→F2→F3.

At block 558, function manager 104 can apply a "longest common substring" algorithm to the invocation sequences created at block 556 in order to find the longest common invocation patterns in the recorded sequences. For example, the use of such an algorithm on the example sequences described above would result in two patterns: F1→F2→F3 and F4→F5. Finally, at block 560, function manager 104 can store the resultant patterns as function chains in its function chain database.

4.2 Pre-Loading Functions

Workflow 600 of FIG. 6 is a basic workflow that can be executed by function manager 104 for pre-loading the next function in a function chain based on the function chain information identified via workflows 500 and 550 of FIGS. 5A and 5B. Starting with block 602, function manager 104 can receive a request to invoke a function F1, where F1 is invoked by or is associated with some entity E (e.g., an application, account, tenant, etc.). At block 604, function manager 104 can select a FaaS host in the FaaS infrastructure for executing function F1 and can send a command to that host to load the image for F1 from FaaS image repository 106. In addition, at block 606, function manager 104 can check, by querying the function chain database, whether F1 is part of any function chain associated with entity E.

If the answer at block 606 is no, the workflow can be terminated. However if the answer is yes, function manager 104 can identity the next function F2 in the function chain (block 608). Function manager 104 can then select a FaaS host in the FaaS infrastructure for executing F2 (which may or may not be the same host as the one executing F1) and can send a command to that host to pre-load the image for F2 from FaaS image repository 106 (block 610). Workflow 600 can subsequently end.

Note that workflow 600 assumes the FaaS infrastructure does not support or implement sticky functions; however, in some embodiments read-ahead chaining can be used together with sticky functions to further reduce function startup latency. An example of this is shown as workflow 700 in FIG. 7.

At block 702, function manager 104 can receive a request to invoke a function F1, where F1 is invoked by or is associated with some entity E (e.g., an application, account, tenant, etc.). At block 704, function manager 104 can check whether F1 can be sticky and a sticky instance of F1 is currently available on a FaaS host. If so, function manager 104 can send a command to that host to execute F1, which can immediately execute it without loading the image of F1 (block 706). On the other hand, if F1 cannot be sticky or there is no available sticky instance, function manager 104 can select a FaaS host in the FaaS infrastructure for executing F1 and can send a command to that host to load the image for F1 from FaaS image repository 106 (block 708).

After block 706/708, function manager 104 can check, by querying the function chain database, whether F1 is part of any function chain associated with entity E (block 710). If no, the workflow can be terminated. However, if the answer at block 710 is yes, function manager 104 can identity the next function F2 in the function chain (block 712) and check whether F2 can be sticky and a sticky instance of F2 is currently available on an FaaS host (block 714).

If F2 can be sticky and an available sticky instance of F2 is available on a particular FaaS host, function manager 104 can send a command to that host to execute F2 once F1 has finished executing (block 716). Note that in this case there is no need for the image for F2 to be pre-loaded since an instance of F2 is already in the primary memory of the host.

On the other hand, if F2 cannot be sticky or there is no available sticky instance, function manager 104 can select a FaaS host in the FaaS infrastructure for executing F2 (which may or may not be the same host executing F1) and can send a command to that host to pre-load the image for F2 from FaaS image repository 106 (block 718). Workflow 700 can subsequently end.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for reducing the startup latency of functions in a Functions-as-a-Service (FaaS) infrastructure, the method comprising:
   receiving, by a computer system, a request to invoke a first function uploaded to the FaaS infrastructure, the request originating from a calling entity;
   selecting, by the computer system, a first host system in the FaaS infrastructure for executing the first function;
   sending, by the computer system to the first host system, a first command to load a software image of the first function into a primary memory of the first host system;
   determining, by the computer system, that the first function is part of a function chain associated with the calling entity, the function chain defining an ordered sequence of functions including the first function and a second function following the first function;
   selecting the first function, by a logic component, to be retained at the primary memory after execution;
   recording one or more function invocation sequences that include the first function;
   identifying a longest common pattern in the one or more function invocation sequences;
   constructing the function chain based on the identified longest common pattern;
   selecting, by the computer system, a second host system in the FaaS infrastructure for executing the second function; and
   sending, by the computer system to the second host system before the first function has completed execution on the first host system, a second command to load a software image of the second function into a primary memory of the second host system.

2. The method of claim 1 wherein the computer system identifies the function chain by accessing a configuration file that includes a list of function chains associated with the calling entity.

3. The method of claim 1 wherein the computer system constructs the function chain by:
   receiving, at a time the first function is uploaded to the FaaS infrastructure, program code for the first function;
   identifying, in the program code, invocations of one or more other functions including the second function; and
   constructing the function chain based on the identified invocations.

4. The method of claim 1 wherein the calling entity is a particular tenant of the FaaS infrastructure.

5. The method of claim 1 wherein prior to selecting the second host system, the computer system determines whether instances of the second function may be sticky and whether a third host system in the FaaS infrastructure exists that has an unused sticky instance of the second function in its primary memory.

6. The method of claim 5 wherein if the computer system determines that the instances of the second function may be sticky and the third host system exists, the computer system sends a third command to the third host system to execute the second function, without sending the second command to the second host system.

7. A non-transitory computer readable storage medium having stored thereon program code executable by a computer system in a Functions-as-a-Service (FaaS) infrastructure, the program code embodying a method for reducing the startup latency of functions in the FaaS infrastructure, the method comprising:

receiving a request to invoke a first function uploaded to the FaaS infrastructure, the request originating from a calling entity;

selecting a first host system in the FaaS infrastructure for executing the first function;

sending, to the first host system, a first command to load a software image of the first function into a primary memory of the first host system;

determining that the first function is part of a function chain associated with the calling entity, the function chain defining an ordered sequence of functions including the first function and a second function following the first function;

selecting the first function, by a logic component, to be retained at the primary memory after execution;

recording one or more function invocation sequences that include the first function;

identifying a longest common pattern in the one or more function invocation sequences;

constructing the function chain based on the identified longest common pattern;

selecting a second host system in the FaaS infrastructure for executing the second function; and sending, to the second host system before the first function has completed execution on the first host system, a second command to load a software image of the second function into a primary memory of the second host system.

8. The non-transitory computer readable storage medium of claim 7 wherein the computer system identifies the function chain by accessing a configuration file that includes a list of function chains associated with the calling entity.

9. The non-transitory computer readable storage medium of claim 7 wherein the computer system constructs the function chain by:

receiving, at a time the first function is uploaded to the FaaS infrastructure, program code for the first function;

identifying, in the program code, invocations of one or more other functions including the second function; and constructing the function chain based on the identified invocations.

10. The non-transitory computer readable storage medium of claim 7 wherein the calling entity is a particular tenant of the FaaS infrastructure.

11. The non-transitory computer readable storage medium of claim 7 wherein prior to selecting the second host system, the computer system determines whether instances of the second function may be sticky and whether a third host system in the FaaS infrastructure exists that has an unused sticky instance of the second function in its primary memory.

12. The non-transitory computer readable storage medium of claim 11 wherein if the computer system determines that the instances of the second function may be sticky and the third host system exists, the computer system sends a third command to the third host system to execute the second function, without sending the second command to the second host system.

13. A computer system comprising:
a processor; and
a non-transitory computer readable medium having stored thereon program code that, when executed by the processor, causes the processor to:

receive a request to invoke a first function uploaded to a Functions-as-a-Service (FaaS) infrastructure, the request originating from a calling entity;

select a first host system in the FaaS infrastructure for executing the first function;

send, to the first host system, a first command to load a software image of the first function into a primary memory of the first host system;

determine that the first function is part of a function chain associated with the calling entity, the function chain defining an ordered sequence of functions including the first function and a second function following the first function;

select the first function, by a logic component, to be retained at the primary memory after execution;

record one or more function invocation sequences that include the first function;

identify a longest common pattern in the one or more function invocation sequences;

construct the function chain based on the identified longest common pattern;

select a second host system in the FaaS infrastructure for executing the second function; and send, to the second host system before the first function has completed execution on the first host system, a second command to load a software image of the second function into a primary memory of the second host system.

14. The computer system of claim 13 wherein the processor identifies the function chain by accessing a configuration file that includes a list of function chains associated with the calling entity.

15. The computer system of claim 13 wherein the processor constructs the function chain by:

receiving, at a time the first function is uploaded to the FaaS infrastructure, program code for the first function;

identifying, in the program code, invocations of one or more other functions including the second function; and constructing the function chain based on the identified invocations.

16. The computer system of claim 13 wherein the calling entity is a particular tenant of the FaaS infrastructure.

17. The computer system of claim 13 wherein prior to selecting the second host system, the processor determines whether instances of the second function may be sticky and whether a third host system in the FaaS infrastructure exists that has an unused sticky instance of the second function in its primary memory.

18. The computer system of claim 17 wherein if the processor determines that the instances of the second function may be sticky and the third host system exists, the processor sends a third command to the third host system to execute the second function, without sending the second command to the second host system.

* * * * *